United States Patent [19]

Neirynck et al.

[11] 4,273,808
[45] Jun. 16, 1981

[54] PROCESS FOR THE INSULATION OF ORIGINAL PAINT LAYERS

[75] Inventors: Albert Neirynck, L'Isle-Adam; Roger Duflos, Viarmes, both of France

[73] Assignee: Societe Francaise Duco, Puteaux, France

[21] Appl. No.: 70,108

[22] Filed: Aug. 27, 1979

[30] Foreign Application Priority Data

Aug. 29, 1978 [FR] France ................ 78 24910

[51] Int. Cl.³ .............................................. B32B 35/00
[52] U.S. Cl. ............................................ 427/142; 427/140; 427/393.5; 428/425.5; 428/458; 428/477.7
[58] Field of Search ................ 427/407.1, 409, 140, 427/142, 393.5; 260/29.2 N; 428/425.5, 458, 461

[56] References Cited

U.S. PATENT DOCUMENTS

| | | |
|---|---|---|
| 2,320,088 | 5/1943 | Leekley ........................ 260/29.2 N |
| 2,882,186 | 4/1959 | Schänberg ...................... 260/29.6 N |
| 2,927,906 | 3/1960 | Schlack ......................... 260/29.62 N |
| 3,440,196 | 4/1969 | Boldebuck ..................... 260/29.2 |
| 3,446,782 | 5/1969 | Okazaki ........................ 260/29.2 N |
| 4,051,087 | 9/1977 | Scoggins ....................... 428/475.5 |

*Primary Examiner*—Sam Silverberg
*Attorney, Agent, or Firm*—Burns, Doane, Swecker & Mathis

[57] ABSTRACT

This invention relates to a process for the insulation of original paint layers, particularly for the application of new paint layers thereover, comprising applying over the original paint to be insulated a barrier layer of a film-forming composition comprising a dicarboxylic acid- and diamine based polyamide resin in alcoholic or aqueous-alcoholic solution, and allowing the resulting protective coating to dry.

This process is particularly applicable to the repair of vehicle bodies.

7 Claims, No Drawings

PROCESS FOR THE INSULATION OF ORIGINAL PAINT LAYERS

This invention relates to the repair of original paint layers applied on a variety of objects or walls and, particularly, on automobile bodies.

Automobile bodies are repaired with paints whose resins are dissolved and diluted for application with active solvents such as aromatic hydrocarbons, ketones, esters and ethers.

On certain original paint layers such as thermoplastic acrylics, or on original paint layers already repaired with varnishes sensitive to said solvents, such as glycerophthalics modified with drying or semi-drying fatty acids whose final drying is more or less achieved, said solvents have a most deleterious effect. An irregular swelling of the underlying paint layer is noted, which makes the appearance of the repair quite unacceptable.

It happens fairly frequently that the car repair painter finds, after application, that the shade of the touch up work does not match that of the original paint layer, or that he has accidentally been the cause of a defect, such as thinness, running, and the like, at the time of application. In such case, the work has to be done all over again, which means that either the coating must be washed with a solvent or that it is necessary to wait until the coating is completely dry before doing the work over again. The coatings to be covered contain sometimes pigments that are soluble in the usual solvents (generally reds, more seldom yellows), which migrate in the paints subsequently applied. Such is also the case with original paint layers soiled with asphalts or tars.

Analogous situations may be found in the case of repairs of various painted objects or of similarly soiled or susceptible walls.

To obtain good insulation results, the present processes involve fairly sophisticated systems that require a relatively long drying time (at least half-a-day and, most frequently, overnight); they may involve the application of glycerophthalic finishes that become completely insoluble after oxydizing drying in air, or of specially formulated epoxy/polyamine or epoxy/polyamide finishes which are available in the form of two components which exhibit the drawback of a limited pot life after they have been admixed.

The rapidly drying polyvinyl butyral resin paint products do not possess a sufficient insulating character and the so-called nitrocellulose or nitrosynthetic sublayers comprise active solvents which moisten the original paint layers.

The shellac or polyester resin insulating materials, when solubilized in alcohol, are fairly efficient, dry rapidly, but exhibit poor ageing properties, with time, such as cracking, peeling, and the like.

The object of this invention is to provide a composition for the insulation of a susceptible original paint layer comprising soluble components, migrants (such as tars, asphalts, pigments, dies, and the like) or which is moistenable (plastic coatings as original paint layers of old or recently applied paints), from the action of the resins and solvents contained in a coating, generally a paint, applied over the aforesaid original paint layers, and which is evidenced by softening, swelling, modification of the volume, and distortion phenomena, and optionally the raising to the surface of the soluble pigments which migrate in the surface layer, all of which leads to the deterioration of the good appearance of the new coating.

This object is attained, according to the invention, by a process for the insulation of original paint layers, typically for the application of new paint layers thereover, comprising applying over the original paint layer to be insulated a barrier layer of a film-forming composition of a dicarboxylic acid- and diamine-based polyamide resin in alcoholic or aqueous-alcoholic solution, and allowing the resulting protective coating to dry.

This invention relates also to a film-forming composition for the insulation of original paint layers, comprising an alcoholic or aqueous-alcoholic solution of a dicarboxylic acid- and diamine-based polyamide resin.

According to another feature, the composition contains a dye or a pigment.

This invention relates also to the application of the aforesaid process to the repair of original paint layers, particularly on vehicle bodies, comprising applying over the original paint layer to be repaired a layer of the liquid film-forming composition, allowing the resulting protective coating to dry, and then applying thereover the new paint used for the repair.

Other features and advantages of this invention will become apparent to those skilled in the art from the following disclosure.

According to this invention, a layer of a polyamide resin-based film-forming composition is applied over the original paint to be insulated.

The useful resins comprise dicarboxylic acids and diamines, and are typically copolyamide resins such as a adipic acid/hexamethylene diamine and caprolactam copolyamide; a hexamethylene diamine/adipic acid, p,p'-diaminodicyclohexylmethane/adipic acid and caprolactam copolyamide; a ternary 6/6, 6/12 caprolactam, adipic acid/hexamethylene diamine and lauryllactam copolyamide; or a ternary 6/6,12/12 caprolactam, dodecanedioic acid/hexamethylene diamine and lauryllactam copolyamide.

In the film-forming composition of this invention, the polyamide resins are dissolved in alcohols, or preferably in water-alcohol mixtures. The resin concentration in the solution is dependent on the nature of the resin and on the viscosity desired for the composition.

Alcohols useful as solvents include typically ethyl alcohol, methyl alcohol, n-propyl alcohol, n-butyl alcohol, and the like, and mixtures thereof.

The limit for the use of some resins may occur at the level of the formation of a thickening of the solution, in gel form, at ordinary temperature. Such solutions become again clear and fluid when heated at about 50° C., but this may objectionably affect their use, and the selection of the resin will be made according to the conditions of use. Indeed, such a phenomenon would not be detrimental in the case of "hot gun spraying".

The stability in the cold of the solutions may be improved by the addition of a plasticizer in an amount up to 40wt.% with respect to the weight of the resin. Suitable plasticizers include typically benzene-sulfonic acid butylamide and 2-ethyl-hexyl p.hydroxybenzoate.

The stability may also be improved by substituting up to half the amount of alcohol in the solution with methylene chloride. Both the above means may also be used in combination.

The insulating property of the composition is due to the insolubility of the copolyamide in the other usual solvents of the subsequent coatings, such as aliphatic and aromatic hydrocarbons, esters, ethers and ketones, and also to their limited compatibility with the other filmformers used in the paint industry.

The original paints to be insulated are generally insensitive to alcohols or mixtures thereof with water.

The insulating composition may contain a suitable dye or pigment for the use contemplated. Any usual pigment or dye useful in the paint industry may be used.

After application of the layer of insulating composition over the original paint to be protected, it is allowed to dry by evaporation of the solvents it contains.

The resulting layer may then be covered by the usual paints desired for the remaining steps. This application may be effected, for example, after drying the insulating layer for 30 minutes in air, at a temperature of about 20° C.

By this means, the invention provides the painter with a simple insulating process, the resulting insulating layer drying rapidly, which makes it possible to proceed rapidly and safely with the subsequent steps of the process.

The copolyamide resins useful in the present invention are commercially available and are usually designed for other uses, such as thermoadhesives (particularly for fabrics), metal wire coatings, sheet metal package linings, or as finishing varnishes on imitation leather. Such resins are available under the trade names "ULTRAMID" (BASF) and "VESTRAMID T" (HÜLS).

Non-limiting Examples of insulating compositions of this invention are given below to illustrate the present invention.

EXAMPLE 1

Colorless insulating composition (1°) Dissolution of the resin

The powdered resin is poured into the solvent mixture heated to 60° C., in a mixer provided with a reflux condenser. The solution has the following composition:

| | |
|---|---|
| ULTRAMID 1 C (BASF) copolyamide resin | 15 wt% |
| 95% Ethyl alcohol | 65 wt% |
| Water | 20 wt% |
| | 100 % |

(2°) Preparation of the colorless insulating composition:

The following mixture is prepared, and is then ready for use:

| | |
|---|---|
| 15% Resin solution obtained in 1°) | 50 wt% |
| 95% Ethyl alcohol | 30 wt% |
| Methyl alcohol | 10 wt% |
| n-Butyl alcohol | 10 wt% |
| | 100 % |

EXAMPLE 2

Pigmented insulating composition

The following components are added in a ball mill (parts by weight):
15% Resin solution of Example 1—20
Titanium dioxide—7
Talc—5
Barium sulfate—8

The above components are dispersed for 16 hours, to give a particle size of 20μ. The mill is then emptied and rinsed repeatedly with ethyl alcohol (20 parts, by weight).

The material running out of the mill is collected in a mixer, and the following ingredients are then added thereto:
15% Resin solution of Example 1—22 parts by wt
n-Propyl alcohol—18 parts by wt
to give a pigmented composition having an outstanding insulating ability and which is perfectly resistant to subsequent applications of paint. It is particularly suitable for the repair of vehicle bodies.

EXAMPLE 3

A pigmented insulating composition is prepared according to the procedure of Example 2, except that the 15% resin solution contains 70% of 95% ethyl alcohol and 15% water.

EXAMPLE 4

A pigmented insulating composition is prepared according to the procedure of Example 2, except that the 15% resin solution contains 60% of 95% ethyl alcohol and 25% water.

EXAMPLE 5

A pigmented insulating composition is prepared according to the procedure of Example 2, except that, to improve its shelf life, benzene-sulfonic acid butylamide is added thereto in an amount of 10wt% by weight of the resin.

EXAMPLE 6

A pigmented insulating composition is prepared according to the procedure of Example 2, except that, to improve its shelf life, 2-ethyl-hexyl p-hydroxybenzoate is added thereto in an amount of 20wt% by weight of the resin.

EXAMPLE 7

A pigmented insulating composition is prepared according to the procedure of Example 2, except that, to improve its shelf life, ⅓ of the total volume of the alcohols present is substituted with methylene chloride.

We claim:

1. Process for the repair of original paint layers, particularly on vehicle bodies, comprising applying on the original paint to be repaired a layer of a liquid film forming composition comprising a dicarboxylic acid- and diamine-based polyamide resin dissolved in a solvent selected from alcohols and water-alcohol mixtures, allowing the resulting protective layer to dry, and then applying thereon the new paint used for the repair.

2. The process as claimed in claim 1, wherein said polyamide resin is a copolyamide resin.

3. The process as claimed in claim 2, wherein said copolyamide is selected from an adipic acid/hexamethylene diamine and caprolactam copolyamide, a hexamethylene diamine/adipic acid, p,p'-diaminodicyclohexylmethane/adipic acid and caprolactam copolyamide, a ternary 6/6, 6/12 caprolactam, adipic acid/hexamethylene diamine and lauryllactam copolyamide, and a ternary 6/6, 12/12 caprolactam, dodecanedioic acid/hexamethylene diamine and lauryllactam copolyamide.

4. The process as claimed in claim 1, wherein said alcohol is selected from methyl alcohol, ethyl alcohol, n-propyl alcohol, n-butyl alcohol and mixtures thereof.

5. The process as claimed in claim 1, wherein is additionally present a material selected from pigments and dyes.

6. The process as claimed in claim 1, wherein is additionally present a plasticizer in an amount of up to 40wt% with respect to the weight of the resin.

7. The process as claimed in claim 1, wherein up to 50% of the alcohol are substituted with methylene chloride.

* * * * *